(12) United States Patent
Rai et al.

(10) Patent No.: US 10,402,770 B2
(45) Date of Patent: Sep. 3, 2019

(54) ASSESSING OUTSOURCING ENGAGEMENTS

(71) Applicant: TATA CONSULTANCY SERVICES LIMITED, Mumbai (IN)

(72) Inventors: Veerendra Kumar Rai, Pune (IN); Sanjit Mehta, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 153 days.

(21) Appl. No.: 14/049,042

(22) Filed: Oct. 8, 2013

(65) Prior Publication Data
US 2014/0114729 A1 Apr. 24, 2014

(30) Foreign Application Priority Data
Oct. 18, 2012 (IN) .......................... 3064/MUM/2012

(51) Int. Cl.
*G06Q 10/06* (2012.01)
*G06Q 10/10* (2012.01)
*G06Q 30/02* (2012.01)

(52) U.S. Cl.
CPC ....... *G06Q 10/06393* (2013.01); *G06Q 10/10* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 2006/0080156 A1* | 4/2006 | Baughn | .......... | G06Q 10/063112 705/7.14 |
| 2007/0101165 A1* | 5/2007 | Kenyon | ............. | G06Q 10/0635 713/193 |

(Continued)

OTHER PUBLICATIONS

Farrell, M., "Developing a Framework for Measuring Outsourcing Engagements Performance," LRN Conference 2010, University of Leeds, Institute for Transportation Studies and CILT (UK), Sep. 1, 2010, 9 pages.

(Continued)

*Primary Examiner* — Alan S Miller
*Assistant Examiner* — Arif Ullah
(74) *Attorney, Agent, or Firm* — Seed IP Law Group LLP

(57) ABSTRACT

Systems and methods for assessing performance of an outsourcing engagement are described. According to the present subject matter, the system(s) implement the described method(s) for assessing the outsourcing engagement. The method includes identifying at least one Critical Success Factor (CSF) associated with the outsourcing engagement between a vendor and a client based on conducive conditions of outsourcing. The method further includes determining at least one of a plurality of parameters and a plurality of sub parameters associated with the identified at least one CSF, wherein the plurality of parameters and the plurality of sub parameters are inter dependent and effect performance of the at least one CSF. Further, the method includes assessing a value of performance for at least one parameter and at least one sub parameter from amongst the plurality of parameters and the plurality of sub parameters respectively, based on a system dynamics model.

10 Claims, 3 Drawing Sheets

(56) References Cited

U.S. PATENT DOCUMENTS

| | | | |
|---|---|---|---|
| 2008/0195431 A1* | 8/2008 | Abe | G06Q 10/10 |
| | | | 705/17 |
| 2013/0041713 A1* | 2/2013 | Henrich | G06Q 10/0635 |
| | | | 705/7.28 |

OTHER PUBLICATIONS

Sanders, et al., "A Multidimensional Framework for Understanding Outsourcing Arrangements," Journal of Supply Chain Management, 43(4), 22 pages, Sep. 22, 2007.

* cited by examiner

ASSESSING OUTSOURCING ENGAGEMENTS

TECHNICAL FIELD

The present subject matter relates, in general, to outsourcing engagements, particularly but not exclusively, to assessment and analysis of the outsourcing engagements.

BACKGROUND

Outsourcing is a process of contracting with an organization or a person to do a particular function. In outsourcing, an organization or a person who offers their services is referred to as a vendor and an organization or a person who takes services of the vendor is referred to as a client. When the client outsources some work to the vendor, they agree to an agreement that reflects the expectation of both, the vendor and the client. Such agreement between the vendor and the client is generally referred to as an outsourcing engagement.

Outsourcing includes domestic contracting and foreign contracting. In domestic contracting, the vendor and the client are from same country and in foreign contracting, the vendor and the client are from different countries. Generally, the client outsources his non-core business to focus on business perceived core to the vendors. For example, a software development company may want to focus only on development business and may outsource service or maintenance of software to a vendor. Further, the client may also outsource his work to a vendor located in a different country in order to save money. For example, production cost of equipments may be less in some countries because of cheap labor and weak currency. In such cases, a client may outsource production of the equipments to such countries.

Due to many underlying advantages, outsourcing has become a trend in many organizations, and especially in information technology (IT) organizations, service industries, logistic, and supply chain industries. With increasing demand of outsourcing, many vendors are now available to the client. The client can choose a vendor of his choice, who meets his requirements. For example, there may be ten vendors who provide technical support services to clients. Then it may get difficult for the client to choose right vendor for his work. Also, there are so many factors, such as vendor leverage, number of employees and competencies of employees at vendor's site are involved in the outsourcing engagements, which make the decision of choosing the right vendor complex.

SUMMARY

This summary is provided to introduce concepts related to assessing performance of an outsourcing engagement, in accordance to an implementation of the present subject matter. This summary is not intended to identify essential features of the claimed subject matter nor is it intended for use in determining or limiting the scope of the claimed subject matter.

In one implementation, a system for assessing performance of an outsourcing engagement is described. The system includes a processor and a CSF Identification module coupled to the processor. The CSF identification module is configured to identify at least one Critical Success Factor (CSF) associated with the outsourcing engagement between a vendor and a client based on conducive conditions of outsourcing, wherein the at least one CSF effects performance of the outsourcing engagement. Further, the system includes a parameterization module coupled to the processor, configured to determine at least one of a plurality of parameters and a plurality of sub parameters associated with the identified at least one CSF, wherein the plurality of parameters and the plurality of sub parameters are interdependent and effect performance of the at least one CSF.

The system also includes a quantification module coupled to the processor, configured to assess a value for at least one parameter and at least one sub parameter from amongst the plurality of parameters and the plurality of sub parameters respectively, based on a system dynamics model, wherein the value is indicative of performance of the at least one parameter and the least one sub parameter, and wherein the system dynamics model is configured to define rules of assessment of the performance based on interdependencies and nature of the at least one parameter and the at least one sub parameter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

Figure 1:
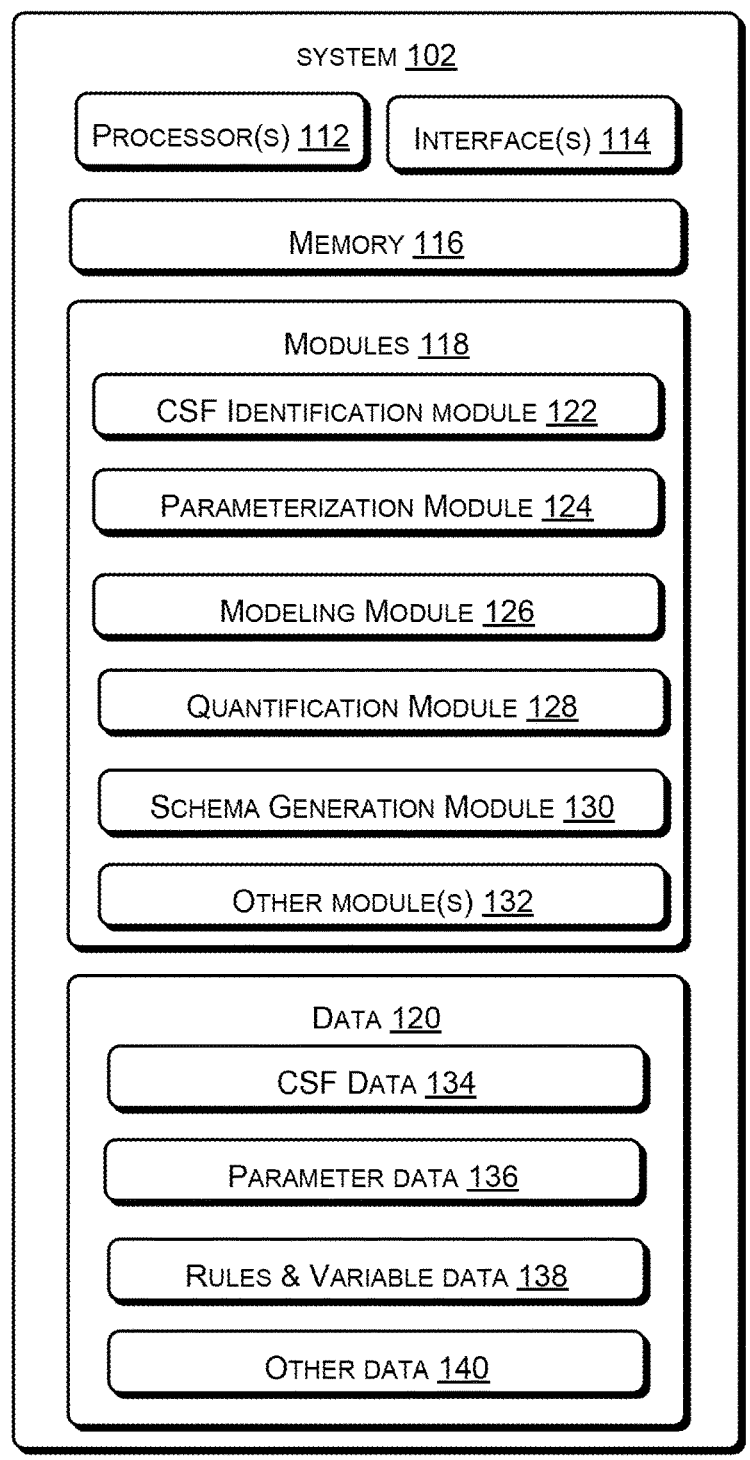
FIG. 1 illustrates an exemplary network environment implementation of an outsourcing engagement assessment system (OEAS), in accordance with an embodiment of the present subject matter.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

System and method for assessing performance of outsourcing engagements are described. Examples of the outsourcing may include, Business process outsourcing (BPO), Knowledge process outsourcing (KPO), Legal process outsourcing (LPO), information technology (IT) process outsourcing, and service process outsourcing. The methods can be implemented in various computing devices communicating through various networks. Although the description herein is with reference to computing systems used in a communication network, the methods and systems may be implemented in other systems capable of assessing outsourcing engagements, albeit with a few variations, as will be understood by a person skilled in the art.

Generally, where there is an outsourcing engagement between a vendor and a client, there are certain expectations by both the parties. Both, the vendor and the client want to extract the best of the outsourcing engagement. The vendor wishes to obtain the best prices for the services offered and, the client wishes to get the best services at the offered prices. While there is an engagement in place between a client and a vendor, both wish to determine that the state of such an engagement in present time.

Various frameworks are used by the vendors and clients to assess the outsourcing engagements. Such frameworks allow the clients and vendors to analyze the performance of the outsourcing engagements based on various factors which affect the performance of the outsourcing engagements. The frameworks, based on this assessment, allow the client take right outsourcing decision, such as changing the client/vendor, solving the determined issues, and the like.

In conventional approaches, generally a framework assesses the performance of outsourcing engagement by analyzing the parameters of the outsourcing engagement. The framework assigns a weight to each of such parameters based on their criticality in the outsourcing engagement. For example, contract complexity may be assigned a higher weight in comparison to automation and tool development based on criticality associated. For example, a weight of 1 may be assigned to the contract complexity and contract completeness. On the other hand, a weight of 0.25 may be assigned to the automation and tool development of the same engagement, which is determined to be less critical than the contract complexity and contract completeness.

In the conventional approaches, the frameworks generally do not consider the inter-dependency among different parameters which is evident in realistic scenario. Due to the inter-dependency, the weights assigned to the parameters are continuously altered based on interaction amongst the parameters. For example, net production cost may be dependent on labor cost and number of employees. An increase in the labor cost may increase the net production cost. In other words, the parameters based on which the outsourcing engagement between a vendor and a client are determined to be static, non-interrelated, and orthogonal to each other, whereas, the parameters are actually interdependent. Therefore, accuracy of the assessment of the performance made by such a framework may get affected due to non-inclusion of inter-dependency among parameters and computation of composite score based on incorrect weights.

Further, the frameworks allow determination of the state of an engagement at any given particular instance, such as a given time period, but does not take into account the duration of the engagement. Such determination of state of an engagement may provide an assessment that may not be sustainable over a long period of time. For example, based on the current situations and values of parameters, the framework may determine that an engagement is optimized and in a good state. However, the framework would not be able to predict the future of the engagement based on present parameters and their state over the past. Hence, any assessment without consideration of future aspects and, the state of the past may not only be dangerous, but may also lead to misinterpretations leading to damages and losses to both, the vendors and clients.

According to an implementation of the present subject matter, system(s) and method(s) to assess performance of an outsourcing engagement are described. The described systems and methods on one hand allow accurate assessment of outsourced engagements, on the other; provide dynamic assessment of the outsourced engagements based on consideration of past statistics. The systems and methods may include statistical analysis of the outsourcing engagement based on simulation of an underlying statistical model where the simulation time periods can be varied to generate engagement's behavior for a specific time in the past or in the future.

Hence, the dynamic assessment of outsourced engagements would also provide the ability to provide a futuristic assessment of the state of the engagement based on the present and past statistical analysis.

In one implementation of the present subject matter, critical success factors associated with any outsourced engagement are defined. The critical success factors (CSF) may define an exhaustive list of factors based on which the state of an outsourced engagement can be determined. In other words, CSFs are the factors based on which the performance of the outsourcing engagement can be assessed. In said implementation, the CFSs may be derived based on the known theories of economics and ideal and conducive conditions of outsourcing. Although, all the CSFs defined may necessarily not be governing and applicable to all the outsourcing engagements, to any particular outsourcing engagement, a subset of the CSFs may be applicable that may define the state of the outsourcing engagement. Further, all the outsourcing engagements may be defined by one or more of the identified CSFs.

In one implementation, the outsourcing engagement to be assessed is determined. That is, from among multiple existing outsourcing engagements, one outsourcing engagement may be identified to be assessed. The selected outsourcing engagement may be any of business process outsourcing (BPO), Knowledge process outsourcing (KPO), Legal process outsourcing (LPO), information technology (IT) process outsourcing, or service process outsourcing.

Upon identification of the outsourcing engagement and associated CSFs, in one implementation of the present subject matter, the CSFs are parameterized to identify parameters and sub parameters affecting behavior and performance of each of the CSFs. For example, one of a CSF identified for an outsourcing engagement may be 'vendor resource utilization' since the CSF vendor resource utilization may affect the overall performance and status of the outsourcing engagement. However, the CSF of vendor resource utilization may be affected by different parameters, such as vendor team, vendor process, vendor knowledge management, and vendor innovation. Therefore, for each CSF identified to be applicable to the outsourcing engagement, multiple parameters and sub parameters may be applicable that may affect the behavior and performance of the CSFs and the outsourcing engagement.

Further, the parameters identified for each CSF may be different for different outsourcing engagements and, may be understood to constitute the factors affecting CSFs. However, there might also be situations that the parameters identified for each CSF, may also include sub parameters and sub-sub parameters that effect and contribute to the state of the parameters under the CSFs. Therefore, it would be understood that a hierarchy of parameters and sub parameters may exist that may affect the state of each of the identified CSF for the outsourcing engagement and, such hierarchy may classify the granularity of factors in which they affect the behavior of the CSF. In other words, a hierarchy may be defined for any given CSF in terms of its associated parameter or its sub parameter. It would be appreciated that the parameters and sub parameters may be causally inter-related with each other criteria in the same or different CSF except for the CSF or critical success factor criteria of which they are part. Further, it is also possible that the sub parameters causally affect their parent parameter or CSF.

In one implementation, as described, the identified parameters and sub parameters of each of the CSF may be inter related and dependent on parameters of other CSFs. To this end, a causal model for an outsourcing engagement is generated. The causal model defines the relation between the different CSFs, its associated parameters and, sub parameters, affecting the outsourcing engagement. As described above, there may be only a subset of CSFs from among the entire exhaustive CSFs applicable to the determined outsourcing engagement. Therefore, the causal model generated for the outsourcing engagement may define the relation among the different CSFs forming the subset of CSFs and are associated with the outsourcing engagement. For example, if for an outsourcing engagement 5 different CSFs are found to be applicable, the causal model for the outsourcing engagement would define the relation among the parameters and sub parameters of these 5 CSFs. Further, the causal model may also identify the inter dependency and relation among the parameters and sub parameters of a single CSF.

It would be understood that the relation among the CSFs, associated parameters and sub parameters may either define interdependency, or provide an association among themselves. In another implementation of the present subject matter, the parameters for each CSF associated with the outsourcing engagement are quantified to identify a value associated with the parameters and the CSFs. For example, to determine the value associated with a particular CSF, the values associated with each of the parameters affecting the behavior of the CSF is evaluated. Similarly, in situations where the each of the parameters includes sub parameters, the value of such sub parameters is evaluated to determine the value associated with the parameters. The value for such parameters would then determine the value associated with the CSFs. It would be understood that each if the sub parameters may also include sub-sub parameters and quantification of such sub-sub parameter may be performed to determine the value associated with the sub parameters.

In one implementation, the quantification of parameters and their sub parameters to determine value associated with them is based on simulation of a system dynamics model of the outsourcing engagement. The system dynamics model can be understood as a rule based model to determine the value of any parameter associated with the CSF of the outsourcing engagement. The system dynamics model associated with the outsourcing engagement may define rules based on variables that characterize the interdependencies among the parameters and CSFs. In other words, the dynamic model may define the rules of assessment of any given parameter.

In said implementation, the rules based on variables defined by the dynamic model may include weights provided to parameters for consideration of time duration of operation of the parameter. For example, for the evaluation of value for the parameter vendor innovation affecting the CSF vendor resource utilization, the dynamic model may define a rule such that if the variable associated with the parameter vendor innovation exists, the value associated with it is higher for engagements with higher experience. That is, value for the parameter vendor innovation where the relation between the client and the vendor is three years old would be higher than the value for vendor innovation where the relation is only 2 years old. It may also happen that the relation between the vendor and the client may be three years old, but the vendor innovation program has only been effective since past 1 year. In such situations, the dynamic model may define the rules such that the effective contribution of the variable associated with the parameter is only considered for 1 year rather that for three years.

Further, based on the consideration of time period of engagement, the value for parameters at any given time instance in the past, or in future are also be computed. For example, in situations where for the identified outsourcing engagement has been effective for 5 years and, the client wishes to assess the state of the outsourcing engagement at a point in past, say 3 years from the start of engagement, how did the outsourcing engagement performed; the dynamic model can be simulated to determine the value of the parameters 2 years before, from present day of relation between the client and the vendor. Similarly, an outsourcing engagement may also be assessed for any time instance in future based on rules of the dynamic model. Therefore, the dynamic model allows assessment of values for parameters at different instances of time.

In one implementation, upon determination of values associated with parameters affecting the CSFs, a relative score for such parameters is evaluated. The evaluation of score, in said implementation is based on a comparison of the value associated with the parameter and a benchmark value associated with the parameter. The benchmark value may define the expectation of the client or the vendor with respect to the parameter to signify that while the parameter is performing at the optimum, what value should be associated with the parameter. In said implementation, the benchmark value may either be based on industry standards, or domain knowledge of the vendor and the client.

For example, a CSF may have 3 parameters associated with it. The 3 parameters may have been assigned values based on simulation of the system dynamics model associated with the outsourcing engagement. For each of such parameters, a benchmark value may be established which may be based on industry standards. In such a situation, based on a comparison of the values of the 3 parameters and their corresponding benchmark values, scores for each parameter may be evaluated. The score evaluated for each of the parameter may define the performance of the parameters as compared to the corresponding benchmark values. Similarly, a score for the CSF may be evaluated based on the system dynamics model. The system dynamics model may take into account, the interdependencies among the parameters, sub parameters and, individual CSFs.

In another implementation, a score for each of the CSF may also be evaluated based on the score of the parameters. To this end, the parameters are associated with corresponding weights that signify the importance of the parameter from amongst the other parameters contributing to the CSF. The score of each parameter is accounted for contribution to the score of the CSF based on the weight associated with the parameter. For example, among three parameters of a CSF, a first parameter may be assigned a weight of 50% due to its importance while the second and third parameters may be assigned weights of 30% and 20%, respectively. In one implementation, the weights are either based on industry standards, or defined by domain knowledge of the vendor and the client.

It would be understood that although the evaluation of score has been described for parameters, the similar method may be implemented in situation where each parameters includes sub parameters which may also include sub-sub parameters.

Further, to assess performance of the outsourcing engagement, a performance score may be computed from the scores of the individual CSFs. In one implementation, the scores each of the CSFs may be aggregated to compute the performance score. However, in another implementation, the CSFs may also be associated with individual CSF weights based on their contribution to the outsourcing engagement to determine the performance score. Further, each CSF may also be affected by other CSFs and have inter-dependency among their parameters and sub parameters. Hence, in said implementation, along with the weights associated with the parameters and sub parameters, the interdependency among other CSFs may be utilized by the systems dynamics model to compute a score associated with each CSF. Therefore, based on the implementation of the described method, a complete and detailed view of an outsourcing engagement can be determined along with parameters responsible for such behavior.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 2:
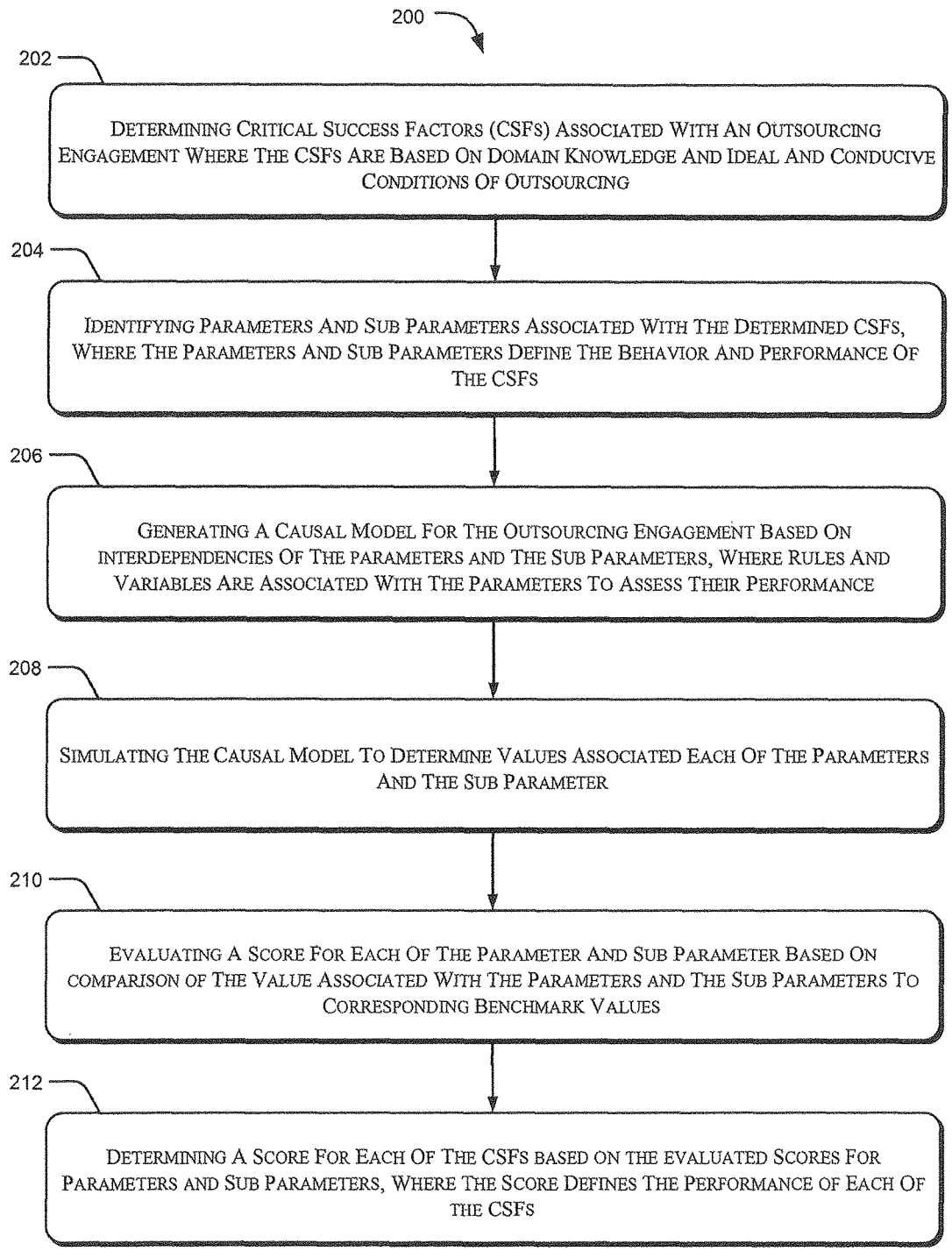
FIG. 2 illustrates an exemplary method for assessing performance of the outsourcing engagements, in accordance with an embodiment of the present subject matter.

The manner in which the systems and methods of accessing outsourcing engagements shall be implemented has been explained in details with respect to the FIGS. 1 and 2. While aspects of described systems and methods of accessing outsourcing engagements can be implemented in any number of different computing systems, transmission environments, and/or configurations, the embodiments are described in the context of the following exemplary system(s).

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The manner in which the systems and methods shall be implemented has been explained in details with respect to the FIGS. 1 and 2. While aspects of described systems and methods can be implemented in any number of different computing systems, transmission environments, and/or configurations, the embodiments are described in the context of the following exemplary system(s).

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

FIG. 1 illustrates a schematic implementation of an outsourcing engagement assessment system (OEAS) 102, in accordance with an embodiment of the present subject matter. For the sake of explanation, the OEAS 102 is referred to as a system 102 hereinafter. The system 102 described herein, can be implemented in any network environment comprising a variety of network devices, including routers, bridges, servers, computing devices, storage devices, etc. In one implementation the system 102 can connected to one or more client devices (not shown), through a communication network (not shown). Such client device may provide information about the details of the outsourcing engagements and associated parameters. Further, these client devices may also be located at vendor's end and client's end.

The system 102 can be implemented as a variety of servers and communication devices. The servers and computing systems that can implement the described method(s) include, but are not limited to, mail server, central directory servers, database server, file server, print server, web server, application server, and the like. The system 102 may also be implemented as a computing device, such as a laptop computer, a desktop computer, a notebook, a workstation, a mainframe computer, a server and the like. The system 102 described herein, can also be implemented in any network environment comprising a variety of network devices, including routers, bridges, servers, computing devices, storage devices, etc.

The system 102 can be implemented in a network that may be a wireless or a wired network, or a combination thereof. The network can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network includes various network entities, such as gateways, routers; however, such details have been omitted for ease of understanding.

In one implementation, the system 102 includes processor(s) 112. The processor 112 may be implemented as one or more microprocessors, microcomputers, microcontrollers, digital signal processors, central processing units, state machines, logic circuitries, and/or any devices that manipulate signals based on operational instructions.

Among other capabilities, the processor(s) is configured to fetch and execute computer-readable instructions stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

Also, the system 102 includes interface(s) 114. The interfaces 114 may include a variety of software and hardware interfaces that allow the system 102 to interact with the entities of the network, or with each other. The interfaces 114 may facilitate multiple communications within a wide variety of networks and protocol types, including wire networks, for example, LAN, cable, etc., and wireless networks, for example, WLAN, cellular, satellite-based network, etc.

In another embodiment of the present subject matter, the system 102 may also include a memory 116. The memory 116 may be coupled to the processor 112. The memory 116 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the system 102 may include module(s) 118 and data 120. The modules 118 and data 120 may be coupled to the processors 112. The modules 118, amongst other things, include routines, programs, objects, components, data structures, etc., which perform particular tasks or implement particular abstract data types. The modules 118 may also be implemented as, signal processor(s), state machine(s), logic circuitries, and/or any other device or component that manipulate signals based on operational instructions.

Further, the modules 118 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 118 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In an implementation, the module(s) 118 includes a CSF Identification module 122, a parameterization module 124, a modeling module 126, a quantification module (128), a schema generation module (130) and other module(s) 132. The other module(s) 132 may include programs or coded instructions that supplement applications or functions performed by the system 102. In said implementation, the data 120 includes a CSF data 134, parameter data 136, rules and variable data 138, and other data 140. The other data 140, amongst other things, may serve as a repository for storing data that is processed, received, or generated as a result of the execution of one or more modules in the module(s) 118. Although the data 120 is shown internal to the system 102, it may be understood that the data 120 can reside in an external repository (not shown in the figure), which may be coupled to the system 102. The system 102 may communicate with the external repository through the interface(s) 114 to obtain information from the data 120.

As mentioned before, the system 102 is configured to assess outsourcing engagements based on critical success factors, their dependent parameters and their involved interdependencies. In one implementation of the present subject matter, critical success factors affecting the performance of any outsourcing engagement are determined. Based on the economic theories, business requirements, and domain knowledge of outsourcing engagements, the CSFs defines may include, but not limited to, production costs reduction (reduction in production costs), transaction costs reduction (transaction costs should not offset cost benefits), contractual completeness, vendor resource utilization (vendor capabilities to be efficiently utilized to gain competitive advantage), demarcation of labor, vendor behavior control (costs of monitoring should be low), stakeholder management (all stakeholders' interests must be met), core competence management (focus on core competencies), relationship exploitation (higher relationship maturity ensures similar contractual behavior), alliance exploitation, social exchange exploitation, and others. These CSFs since are derived from economic theories, each one of the CSF explains the ideal and conducive conditions for outsourcing.

In one implementation of the present subject matter, the CSF identification module 122 of the system 102 is configured to determine the CSFs applicable to an outsourcing engagement whose performance is to be assessed. Since different outsourcing engagements work are implemented in different domains and interact with different vendors and clients, the CSFs affecting the performance of each of the outsourcing engagement are different. The CSF identification module 122 may identify the domain of the outsourcing engagement, the type of outsourcing engagement, and the nature of the outsourcing engagement to determine the CSFs affecting the performance of the outsourcing engagement.

For example, from the above 11 described CSFs, for an outsourcing engagement 'a', the CSF identification may only identify 5 CSFs, production costs reduction (reduction in production costs), transaction costs reduction (transaction costs should not offset cost benefits), vendor resource utilization (vendor capabilities to be efficiently utilized to gain competitive advantage), social exchange exploitation, and core competence management (focus on core competencies) affecting the performance of the engagement 'a'. Similarly, for another outsourcing engagement 'c', the CSF identification module 122 may identify all the 11 CSF to be affecting the performance of the outsourcing engagement 'c'. In said implementation, the CSFs identified to be associated with the outsourcing engagement are stored in the CSF data 132.

The CSFs identified for the outsourcing engagement by the CSF identification module 122 are utilized by the parameterization module 124 to identify associated parameters and sub parameters with each of the identified CSF. Essentially, by way of parameterization, the parameterization module 124 creates a CSF hierarchy where parameters lower in the hierarchy affect the performance of the parameters above in the hierarchy and finally, the performance of the CSFs. The parameterization module 124 therefore, determines the parameters and sub parameters to be associated with the identified CSFs. In one implementation, the parameters associated with the CSFs are based on the domain knowledge and type of the outsourcing engagement. However, in another implementation, the parameters may also be associated based on the expectation and requirement of vendors and clients.

For example, an identified CSF: vendor resource utilization may be associated with the parameters that may include vendor team, vendor process, vendor knowledge management, and vendor innovation. Each of these parameters may further include multiple different sub parameters that may define behavior and performance of the identified parameters and corresponding CSF. The parameterization module 124 may therefore, create a list of sub parameters affecting the behavior and performance of the parameters. In one implementation, the parameterization module 124 forms the list from sub parameters affecting the parameter vendor team, as follows:

TABLE 1

Vendor Team

| Sub Parameters | Remarks |
| --- | --- |
| Vendor Leverage | Ratio of Vendor FTEs to Client FTEs |
| Vendor Team Competency | Initial Competency at the On boarding Time, with respect to competency requirements |
| Complexity of Skill Requirements | Average Complexity of Competency Requirements |
| Number of SMEs in the Project | Subject Matter Experts in the Team |
| Average Hiring Delay | Actual Hiring Delay is a function of Average Delay and Flexibility of Resource Hiring |

Similarly, the parameterization module 124 may also identify sub parameters for other parameters as follows:

TABLE 2

Vendor Processes

| Sub Parameters | Remarks |
| --- | --- |
| Vendor Expertise w.r.t Outsourced Function | Measured in Terms of Vendors Past Experiences, Delivery Records and Processes Developed |
| Processes Used (Vendor/ Client) | Client Processes are used for Project Execution |
| Initial Process Maturity in Terms of | |
| a) Automation and Tool Support for Required Functions | Vendor Capability in terms of Tool support |
| b) Process Standardization and Best Practices | Vendor Process Maturity. |

TABLE 3

Knowledge Management

| Sub Parameters | Remarks |
| --- | --- |
| Vendor's Incentive for Knowledge Management | No Incentive for Vendor to Document and Transfer Knowledge pertaining to Project Execution |
| Contractual Obligation for Knowledge Management | Inadequate Contractual Obligations for the Vendor Team to create and transfer Knowledge-base assets |
| Client's Incentive for Knowledge Management | Based on factors such as Increased Overheads, Project Performance and Costs of Substitution |

TABLE 4

Vendor Innovation

| Sub Parameters | Remarks |
| --- | --- |
| Scope for Vendor Innovation | Scope only in terms of Team Development |

Therefore, as depicted above, the different parameters associated with the CSF may further be associated with sub parameters by the parameterization module 124.

In one implementation of the present subject matter, the schema generation module 130 is configured to form a schema of defined critical success factors, associated parameters and sub parameters. The schema generation module 130 is also configured to identify the hierarchies associated with CSFs, parameters and the sub parameters. Therefore, the schema generation module 130 may allow ease in assessment of an outsourcing engagement by providing directly access to relevant critical success factors and associated parameters while re-assessment of the outsourcing engagement. This may allow utilization of existing parameterization and established hierarchical classification of CSFs for re-evaluations.

In one implementation of the present subject matter, upon identification of the parameters and the sub parameters associated with CSFs, the modeling module 126 may identify a causal model for the identified outsourcing engagement, based on the determined CSFs, parameters, and the sub parameters. Since all the identified parameters causally influence or are causally influenced by other parameters, or both, the interdependency among the parameters is identified by the modeling module 126 in the form of a causal model. In other words, the causal model may capture the inter-dependencies of the parameters and sub parameters associated with the CSFs where all the parameters and sub parameters are also inter-dependent. For instance, the level of comprehensiveness of a contract determines transaction costs resulting due to uncertainty and monitoring costs resulting due to comprehensiveness of performance measurement metrics defined in the contract.

In another example of a critical success factor 'Production costs', the CSF 'Production costs' can be associated with parameters: 'Labor costs', 'Infrastructure costs (Hardware)' and 'Infrastructure costs (Software)'. In such a situation, to assess the performance of 'Production costs', it is not sufficient to evaluate the performance of production cost based on a weighted sum of the parameters as the parameter and sub parameters may be inter related. That is, the parameter hardware infrastructure cost may be dependent on the software infrastructure cost where softwares utilized define the hardware required, thereby governing the hardware cost. Therefore, the modeling module 126 defines the causal model including the interdependencies among the parameters and the sub parameters.

Figure 3:
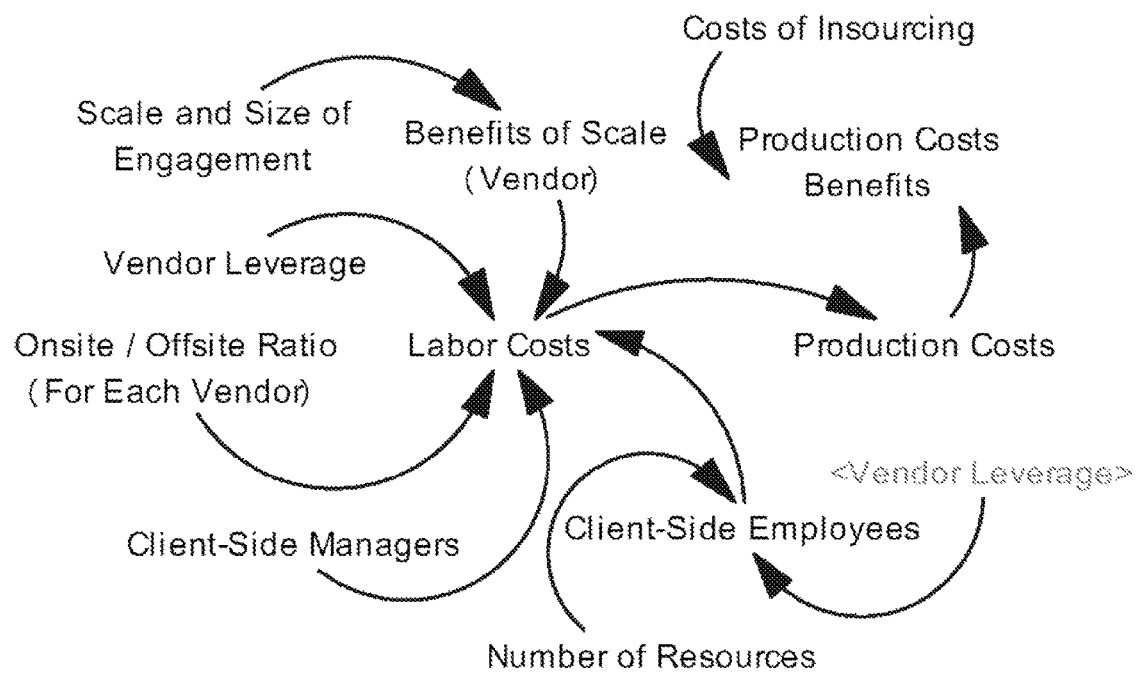
FIG. 3 illustrates a Causal Model, in accordance with an embodiment of the present subject matter.

In one implementation, for the CSF production cost, the modeling module 126 may define the causal model of FIG. 3.

The above depicted causal model defines the relation among different parameters and sub parameters of the CSF 'Production Cost'. According to the above depicted causal model, it would be understood that production cost is based on labor cost which in turn, is based on multiple sub parameters such as scale and size of engagements and, client side employees. Therefore, the causal model defined by the modeling module 126 defines the relation and interdependencies between the different parameters and sub parameters.

In one implementation of the present subject matter, based on the causal model defined by the modeling module 126, a system dynamic model is generated to assess value associated with each of the identified CSFs, parameters, and the sub parameters. As described before, the system dynamics model can be understood as a rule based model to determine the value of any parameter and sub parameter associated with the CSF of the outsourcing engagement. The value may define the performance of the parameter and sub parameter accounting for their interdependencies and nature.

To this end, system dynamic model associated with the outsourcing engagement may define rules based on variables that characterize the interdependencies among the parameters and CSFs. In other words, the dynamic model may define the rules of assessment of any given parameter based on associated variables. In one implementation of the present subject matter, the variables associated with the parameters are defined into one of the different categories of a dynamics model, such as level or stock, rate, and auxiliary where the categories of variables that are associated with any parameter are based on the interdependency of the parameter with other parameters and its own nature. A variable may be defined as a level or a stock variable where, the variable may accumulate value or deplete value over time based on the nature of the parameter. Further, another variable may be defined as a rate variable where the rate variable may define the rate of accumulation or depletion of value of the parameter. Furthermore, an auxiliary variable may be constant with time and may be derived based on other variable.

For example, a parameter that appreciates with time at a fixed rate may be associated with two variables, where one is a stock variable that appreciates with time and the other is a rate variable that defines the rate of appreciation. Similarly, another parameter may take a value that is not based on time and dependent only on the vendor or the client current state. Such a parameter may only be associated with an auxiliary variable in the systems dynamics model. Hence, it would be appreciated that the variable in the system dynamics model are connected using causal relationships based on the generated causal model for the outsourcing engagement.

In an implementation, for each variable, an equation may be defined in the system dynamics model that may compute its value as a function of variables that causally affect it. In such implementation, it would be understood that for constant auxiliary variables (data parameters), values are initialized at the start assessment.

According to an implementation of the present subject matter, the system dynamics model is simulated to generate the behavior of the outsourcing engagement over a period of time. Such simulation may also identify simulated parameters and simulated sub parameters corresponding to the identified parameters and sub parameters, where the simulated parameters and the sub parameters have a value associated defining the performance of the parameters and the sub parameters. Mathematically, a system dynamics model can be represented as chain differential equations where simulation of a system dynamics model is equivalent to integration of level variables over time. The result of the simulation is the behavior of parameters of the outsourcing engagement represented using values captured by its constituent variables. In such representation, each variable behavior is a time series with a value assigned to it for every time-step over the period of simulation.

For example, upon simulation of a system dynamics model for an outsourcing engagement, for the CSF vendor resource utilization, the identified parameters and sub parameters may be associated with the simulated parameters and sub parameters along with values defining the performance of the CSF. The simulation result of the CSF vendor resource utilization may include the simulated parameters and sub parameters as follows:

TABLE 5

| Vendor Team | | |
|---|---|---|
| | Value | Remarks |
| Parameters | | |
| Vendor Leverage | 0.7 | Ratio of Vendor FTEs to Client FTEs |
| Vendor Team Competency | 0.5 | Initial Competency at the Onboarding Time, with respect to competency requirements |
| Complexity of Skill Requirements | 0.5 | Average Complexity of Competency Requirements |
| Number of SMEs in the Project | 2 | Subject Matter Experts in the Team |
| Average Hiring Delay | 3 Days | Actual Hiring Delay is a function of Average Delay and Flexibility of Resource Hiring |
| Simulated Parameters | | |
| Vendor Team Competency | 0.7 | Vendor Team Competency increases to 0.7 over the course of Project Execution |
| Vendor Team Rarity | 0.65 | Resources Rare owing to understanding of Client's Domain and Outsourced Functions |
| Vendor Team Substitution/Imitation Ease | 0.2 | Rarity Coupled with Low level of Knowledge Management Leads to High costs of Substitution |
| Vendor Resource Utilization | 0.93 | 93% Resource utilization owing to Flexibility of Hiring and Replacing Resources |
| Resource On-Boarding Time | 25 Days | At the Start of the Project - Time for Resources to become Productive |

TABLE 6

Vendor Processes

| Parameters | Value | Remarks |
|---|---|---|
| Vendor Expertise w.r.t Outsourced Function | 0.7 | Measured in Terms of Vendors Past Experiences, Delivery Records and Processes Developed |
| Processes Used (Vendor/Client) | Client | Client Processes are used for Project Execution |
| Initial Process Maturity in Terms of | | |
| a) Automation and Tool Support for Required Functions | 0.3 | Vendor Capability in terms of Tool support - 0.65 |
| b) Process Standardization and Best Practices | 0.3 | Vendor Process Maturity |
| Automation and Tool Development | Low | Decision Parameter based on Resource Deficit and Performance Discrepancy |
| Process Standardization and Innovation Capabilities | Low | Decision based on Productivity and Service Quality Discrepancy |
| Simulated Parameters | | |
| Automation and Tool Support Development | 0.46 | 50% Development over the course of Project Execution |
| Process Maturity | 0.52 | 70% Improvement in Standardization and Maturity of Processes over the course of Project Execution |
| Scalability in Terms of | | |
| a) Resource Scalability | 20% | 20% Decrease in Resource Requirements due to Automation and Tool Support |
| b) Process Scalability | 0.5 | Directly Proportional to Process Maturity |
| Increase in Project Performance | 3 Fold | Three fold Increase in Productivity and Two Fold Increase in Service Quality |

TABLE 7

Knowledge Management

| Parameters | Value | Remarks |
|---|---|---|
| Vendor's Incentive for Knowledge Management | Low | No Incentive for Vendor to Document and Transfer Knowledge pertaining to Project Execution |
| Contractual Obligation for Knowledge Management | 0.2 | Inadequate Contractual Obligations for the Vendor Team to create and transfer Knowledge-base assets |
| Client's Incentive for Knowledge Management | Average | Based on factors such as Increased Overheads, Project Performance and Costs of Substitution |
| Simulated Parameters | | |
| Level of Knowledge Management | 0.4 | 40% of Knowledge Generated is Formalized and Transferred to the Client |

TABLE 8

Vendor Innovation

| Parameters | Value | Remarks |
|---|---|---|
| Scope for Vendor Innovation | Low | Scope only in terms of Team Development |
| Simulated Parameters | | |
| Vendor-Side Innovation | 0 | No Innovative capabilities of the vendor exploited |

Thus, the above described tables, Table 5 to Table 8 describe the simulated sub parameters for the parameters vendor team, vendor process, vendor knowledge management, and vendor innovation. The simulated sub parameters listed in each table shown below are also provided with value associated them based on defined rules and corresponding variables. It would be understood by those skilled in the art that although the description has been made in reference to parameters and sub parameters of CSF vendor resource utilization, the described method and technique may also be implemented to other CSFs and their corresponding parameters and sub parameters.

In one implementation of the present subject matter, certain sub parameters upon simulation are not provided with a value as these values are dependent on clients and vendors and, not defined based on rules and variables of the system dynamics model. In said implementation, the value corresponding to such variables are received from either clients, vendors, or users based on their domain knowledge and expectations. For example, if an identified parameter is identified to be vendor net human resource asset, such parameter may not be associated with any level variable or rate variable as the predictability is low. Therefore, such parameters may receive value directly from the vendor based on current values and factual findings.

Further, in another implementation of the present subject matter, the value corresponding to each parameter may be assigned based on vendor and client inputs received through questionnaires, surveys, or fact findings. Such assessment of parameter values may be subjective and include different expectation of vendors and clients, along with actual contribution of each parameter.

In one implementation of the present subject matter, the quantification module 128 of the system 102 is configured to identify benchmark value associated with each parameter and sub parameter, either based on domain knowledge, or through expectations of clients and vendors. For example, in the above depicted table 7, for the sub parameter resource scalability, the benchmark may be determined to be 50% based on domain knowledge. That is, the domain knowledge may reflect a possibility of 50% automation as compared to 20% achieved for the outsourcing engagement. It may also occur that the benchmark value is provided by the vendors and clients based on their expectations. For example, for the above mentioned sub parameter resource scalability, the vendor may define the benchmark to be 35% instead of 50% as the vendor may expect automation to be not more that 35% in the outsourcing engagement. Therefore, based on different criteria, the benchmark values associated with the parameters and sub parameters are evaluated.

In one implementation, based on the evaluated value, and the associated benchmark value of the sub parameters, a score is evaluated for each sub parameter. The score will define the performance of the sub parameter with respect the benchmark. For example, the quantification module 128 may determine scores for the sub parameters of the parameters vendor team, vendor process, vendor knowledge management, and vendor innovation based on the values.

Upon determination of the scores for the sub parameters associated with the parameters, in one implementation of the present subject matter, contribution of each sub parameter towards the parameter is identified in terms of weights. It would be understood that among the identified sub parameters some may be important and may contribute more to the performance of the associated parameter, while others may be less important and may contribute very little to the performance of the associated parameter. Hence, the sub parameters that are important may be associated with higher weight as compared to the parameters which are less important and contribute less to the performance of the CSF. In said implementation, the evaluation of scores and association of weights with each of the sub parameters is depicted for the parameters of CSF vendor resource utilization as follows:

TABLE 9

Vendor Team

| Parameters | Value | Remarks | Score (of 10) | Weights |
|---|---|---|---|---|
| Vendor Leverage | 0.7 | Ratio of Vendor FTEs to Client FTEs | | |
| Vendor Team Competency | 0.5 | Initial Competency at the On boarding Time, with respect to competency requirements | | |
| Complexity of Skill Requirements | 0.5 | Average Complexity of Competency Requirements | | |
| Number of SMEs in the Project | 2 | Subject Matter Experts in the Team | | |
| Average Hiring Delay | 3 Days | Actual Hiring Delay is a function of Average Delay and Flexibility of Resource Hiring | | |
| Simulated Parameters | | | | |
| Vendor Team Competency | 0.7 | Vendor Team Competency increases to 0.7 over the course of Project Execution | 7 | 0.25 |
| Vendor Team Rarity | 0.65 | Resources Rare owing to understanding of Client's Domain and Outsourced Functions | 6.5 | 0.18 |
| Vendor Team Substitution/ Imitation Ease | 0.2 | Rarity Coupled with Low level of Knowledge Management Leads to High costs of Substitution | 8 | 0.18 |
| Vendor Resource Utilization | 0.93 | 93% Resource utilization owing to Flexibility of Hiring and Replacing Resources | 9.5 | 0.25 |
| Resource On-Boarding Time | 25 Days | At the Start of the Project - Time for Resources to become Productive | 10 | 0.14 |

TABLE 10

Vendor Processes

| Parameters | Value | Remarks | Score (of 10) | Weights |
|---|---|---|---|---|
| Vendor Expertise w.r.t Outsourced Function | 0.7 | Measured in Terms of Vendors Past Experiences, Delivery Records and Processes Developed | | |
| Processes Used (Vendor/ Client) | Client | Client Processes are used for Project Execution | | |
| Initial Process Maturity in Terms of | | | | |
| a) Automation and Tool Support for Required Functions | 0.3 | Vendor Capability in terms of Tool support - 0.65 | | |
| b) Process Standardization and Best Practices | 0.3 | Vendor Process Maturity - 0.6 | | |

TABLE 10-continued

Vendor Processes

| | Value | Remarks | Score (of 10) | Weights |
|---|---|---|---|---|
| Automation and Tool Development | Low | Decision Parameter based on Resource Deficit and Performance Discrepancy | | |
| Process Standardization and Innovation Capabilities | Low | Decision based on Productivity and Service Quality Discrepancy | | |
| Simulated Parameters | | | | |
| Automation and Tool Support Development | 0.46 | 50% Development over the course of Project Execution | 7 | 0.25 |
| Process Maturity | 0.52 | 70% Improvement in Standardization and Maturity of Processes over the course of Project Execution | 7.5 | 0.25 |
| Scalability in Terms of | | | | |
| a) Resource Scalability | 20% | 20% Decrease in Resource Requirements due to Automation and Tool Support | 8.5 | 0.15 |
| b) Process Scalability | 0.5 | Directly Proportional to Process Maturity | 5 | 0.15 |
| Increase in Project Performance | 3 Fold | Three fold Increase in Productivity and Two Fold Increase in Service Quality | 8.5 | 0.2 |

TABLE 11

Knowledge Management

| | Value | Remarks | Score (of 10) | Weights |
|---|---|---|---|---|
| Parameters | | | | |
| Vendor's Incentive for Knowledge Management | Low | No Incentive for Vendor to Document and Transfer Knowledge pertaining to Project Execution | | |
| Contractual Obligation for Knowledge Management | 0.2 | Inadequate Contractual Obligations for the Vendor Team to create and transfer Knowledge-base assets | | |
| Client's Incentive for Knowledge Management | Average | Based on factors such as Increased Overheads, Project Performance and Costs of Substitution | | |
| Simulated Parameters | | | | |
| Level of Knowledge Management | 0.4 | 40% of Knowledge Generated is Formalized and Transferred to the Client | 5 | 1 |

TABLE 12

Vendor Innovation

| | Value | Remarks | Score (of 10) | Weights |
|---|---|---|---|---|
| Required Data Parameters | | | | |
| Scope for Vendor Innovation | Low | Scope only in terms of Team Development | | |
| Simulated Parameters | | | | |
| Vendor-Side Innovation | 0 | No Innovative capabilities of the vendor exploited | 0 | 10 |

Hence, the above depicted tables, table 8 to table 12, describe that the weights and scores that are associated with each sub parameter of a parameter, affecting the performance of a CSF. Based on the computation of the scores for subparameters, an aggregate score for parameters is computed. The quantification module 128 is configured to assess the overall score for each parameter based on the scores of the sub parameters. For example, for the CSF vendor resource utilization, based on the tables 8 to table 12, the quantification module 128 may assess the score of the parameters to determine their performance as follows:

TABLE 13

Vendor Resource Utilization

| | Score | Remarks |
|---|---|---|
| Vendor Team Performance | | |
| Vendor Resource Utilization (Vendor Team) | 8.135 | High Level of Vendor Utilization in terms of Vendor Team |

TABLE 13-continued

Vendor Resource Utilization

| | Score | Remarks |
|---|---|---|
| Vendor Process Performance | | |
| Overall Process Performance (Client Processes) | 7.35 | Process Performance Level compared to optimal process performance if Vendor Processes are used |
| Vendor Knowledge Management Performance | | |
| Level of Knowledge Management | 5 | No Contractual Obligation for the Vendor to Knowledge Management |
| Vendor-Side Innovation | 0 | No Vendor-Side Innovation |

The above table, table 13 depicts the aggregated score for each parameter of the CSF Vendor Resource Utilization based on the scores evaluated for the simulated sub parameters. The quantification module 128 determines the scores for the parameters based on the values associated with the sub parameters and their corresponding weights. In the said implementation, the score computed for each parameter is based on the aggregated sum of the individual scores of sub parameters accounted according to their weight. However, in another implementation, the score for the parameters may also be evaluated using techniques other than aggregated sum, such as variance, mean, average, and standard deviation.

As depicted in the Table 13 above, the scores for different parameters for the CSFs other than vendor resource utilization may also be computed to determine the performance of the other CSFs based on the described method. Further, similar to the evaluation of scores for parameters, a score for each CSF is evaluated. To this end, each parameter may also be associated with a specific weight based on its contribution to the CSF. For example, in the above described example, parameters for vendor resource utilization include vendor team, vendor process, vendor knowledge management, and vendor innovation. Among these parameters, for the identified outsourcing engagement, the maximum contribution to vendor resource utilization may be from vendor team and vendor process and therefore, these parameters may be given more weight as compared to the other parameters vendor knowledge management and vendor innovation.

Based on the scores determined for parameters of different CSFs, the final score of each CSF associated with the identified outsourcing engagement is determined. In one implementation, the final score for each CSF is indicative of the performance of the CSF. In an example, the score of the CSFs associated with the outsourcing engagement are depicted as follows:

TABLE 14

| | Index Score | Inferences |
|---|---|---|
| Critical Success Factor | | |
| Production Cost Advantages | 6 | Higher Cost Advantages Possible (Nearly 40% more) |
| Transaction Costs | 7.5 | Lower Transaction Costs Possible (Reduction by nearly 25%) |
| Contractual Completeness | | |
| a) Contractual Completeness | 7 | Contractual Completeness Low, but complemented by high relationship maturity |
| b) Enforcement Costs | 6.6 | High Enforcement Costs (monitoring costs and overheads) and can be reduced |
| Vendor Resource Exploitation | | |
| a) Performance Discrepancy | 7.35 | Performance Discrepancy Low because of Client's decision related to Process Improvement and Automation. Leads to Higher Process Improvement Costs |
| b) Resource Exploitation Index | 5.1 | Vendor Resources and Process Excellence not Exploited |
| Focus on Core Competendes | | |
| a) Potential for Outsourcing based on Core Competence Theory | 7.8 | The function has low effect on organization's core competencies and given the level of vendor expertise, the function can be outsourced to the vendor to exploit vendor's capabilities. However, since vendor capabilities are not exploited in the current scenario hence the lower score for the parameter |
| b) Focus on Core Competencies | 5 | Owing to low utilization of vendor capabilities (non-suitability of operating model) and higher overhead, full value of the engagement in terms of employee bandwidth and financial slack generated is not realized |

In the above defined table 14, the CSFs associated with an outsourcing engagement are defined with their respective scores. Further, as described above, the scores associated with each of the CSF is based on the corresponding scores of associated parameters and sub parameters. In one implementation of the present subject matter, for assessment of the outsourcing engagement, the CSFs and their behavior defined by all parameters and sub parameters are enlisted with their assigned values, benchmark values, scores and applicable weights. The enlisting of the CSF scan be understood to be as classification nodes where the parameters higher in hierarchy are listed along with their aggregated score and associated weights followed by sub parameters along with their aggregated score and associated weights.

In said implementation, a user may define analysis parameter to define the granularity at which the assessment of the outsourcing engagement be done. That is, a user may define the analysis parameter to determine the assessment of the outsourcing engagement based only on the score of CSFs. However, another user may define the analysis parameter to include the score of parameters and sub parameters to analyze the performance of the outsourcing engagement. Based on the defined analysis parameter, the system 102 may analyze the outsourcing engagement to identify parameter and sub parameters with low scores, and utilize the system dynamics model to analyze the consequences and factors for observed behavior.

FIG. 2 illustrates method 200 for assessing performance of an outsourcing engagement, according to an embodiment of the present subject matter. The order in which the method 200 is described is not intended to be construed as a limitation, and any number of the described method blocks can be combined in any order to implement the method 200, or any alternative methods. Additionally, individual blocks may be deleted from the method without departing from the spirit and scope of the subject matter described herein. Furthermore, the method can be implemented in any suitable hardware, software, firmware, or combination thereof.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the method can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media such as a magnetic disks and magnetic tapes, hard drives, or optically readable digital data storage media. The embodiments are also intended to cover both communication network and communication devices configured to perform said steps of the exemplary methods.

Referring to FIG. 2, at block 202, Critical Success Factors (CSFs) associated with an outsourcing engagement are determined. The CSFs associated with the outsourcing engagement are based on domain knowledge and, ideal and conducive conditions of outsourcing. In one implementation, the CSFs associated to the outsourcing engagement are determined from production costs reduction (reduction in production costs), transaction costs reduction (transaction costs should not offset cost benefits), contractual completeness, vendor resource utilization (vendor capabilities to be efficiently utilized to gain competitive advantage), demarcation of labor, vendor behavior control (costs of monitoring should be low), stakeholder management (all stakeholders' interests must be met), core competence management (focus on core competencies), relationship exploitation (higher relationship maturity ensures similar contractual behavior), alliance exploitation, and social exchange exploitation.

At block 204, parameters and sub parameters associated with the determined CSFs are identified. The parameters and the sub parameters may define the behavior and performance of the CSFs associated with the outsourcing engagement.

At block 206, a causal model for the outsourcing engagement is generated based on interdependencies and relations among the parameters and the sub parameters. The causal model thus generated, also define rules and variables associated with the parameters and the sub parameter to assess their performance.

At block 208, the generated causal model is simulated to determine values associated with each of the parameters and sub parameters. The simulation may be based on the rules and variables of the causal model where the determined value of each parameter is indicative of its present state that contributes to the performance of the CSFs.

At block 210, a score for each of the parameters and sub parameters is evaluated based on comparison of the determined value and corresponding benchmark value. The benchmark value for each parameter and sub parameters may either be based on domain knowledge or, be determined based on the expectations of vendors and clients engaged in the outsourcing engagement.

At block 212, a score for each of the determined CSFs is determined based on the score of the parameters and sub parameters associated with each of the CSFs. As described before, the score of each parameter or a sub parameter may define their performance. And, similarly, the score determined for each of the CSF may define the performance of the CSF. In one implementation, parameters are also associated with weights to determine the score for the CSFs where the weights are indicative of the effective contribution of the parameter towards the performance of the CSF.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

We claim:

1. A system for identifying inter-dependencies among a plurality of parameters and sub-parameters and one or more Critical Success Factors (CSFs) in assessing performance of an outsourcing engagement comprising:

a processor; and a memory, the memory coupled to the processor wherein the processor is capable of executing programmed instructions stored in the memory to:

identify at least one Critical Success Factor (CSF), from the one or more CSFs, associated with the outsourcing engagement, wherein the at least one CSF is identified based on domain of the outsourcing engagement, type of the outsourcing engagement and nature of the outsourcing engagement;

generate a causal model by determining at least one parameter from the plurality of parameters and at least one sub parameter from the plurality of sub parameters affecting performance and behavior of the identified at least one CSF, wherein the at least one parameter and at least one sub parameter of each of the CSF are inter related and dependent on parameters of other CSFs, wherein the causal model generated for the outsourcing engagement defines relation among the identified CFS and other CSFs forming subset of CSFs associated with the outsourcing engagement, and wherein a hierarchical classification of CSFs associated with the plurality of parameters and the plurality of sub parameters determines the at least one parameters and the at least one sub parameters to be associated with the identified CSFs;

simulate the generated causal model to determine a value associated with the at least one parameters and the at least one sub parameters, wherein the simulation is based on rules and variables of the causal model, and wherein the determined value is indicative of present state of the at least one parameters and the at least one sub parameters contributing to the performance of the CSFs; and generate a system dynamics model associated with the outsourcing engagement to assess the value for the determined at least one parameter and at least one sub parameter wherein the system dynamics model is configured to define rules of assessment of the performance based on inter-dependencies and nature of the at least one parameter and the at least one sub parameter, wherein the rules of assessment are based on variables characterizing the interdependencies among the plurality of parameters and the at least one CSF, wherein the variables are one of a level variable, a stock variable, a rate variable, and an auxiliary variable;

identify a benchmark value for at least one of the plurality of parameters and the plurality of sub parameters based on at least one of industry standards and vendor-client expectations, wherein the benchmark value is indicative of ideal performance; and compare the value assessed for the at least one parameter and the at least one sub parameter with the benchmark value identified for the at least one parameter and the sub parameter respectively to generate a score for the at least one parameter and the at least one sub parameter.

2. The system as claimed in claim 1, said processor is further configured by the instructions to determine a causal model for the outsourcing engagement based on the interdependencies among the at least one the plurality of parameters, and the plurality of sub parameters for developing the system dynamics model.

3. A computer implemented method for identifying interdependencies among a plurality of parameters and sub-parameters and one or more Critical Success Factors (CSFs) in assessing performance of an outsourcing engagement comprising:

identifying, by a processor, at least one Critical Success Factor (CSF) associated with the outsourcing engagement, wherein the at least one CSF is identified based on domain of the outsourcing engagement, type of the outsourcing engagement and nature of the outsourcing engagement;

generating, by the processor, a causal model, wherein the at least one parameter and at least one sub parameter of each of the CSF are inter related and dependent on parameters of other CSFs, and wherein the causal model generated for the outsourcing engagement defines relation among the identified CFS and other CSFs forming subset of CSFs associated with the outsourcing engagement, and wherein a hierarchical classification of CSFs associated with the plurality of parameters and the plurality of sub parameters determines the at least one parameters and the at least one sub parameters to be associated with the identified CSFs;

simulating, by the processor, the generated causal model to determine a value associated with the at least one parameters and the at least one sub parameters, wherein the simulation is based on rules and variables of the causal model, and wherein the determined value is indicative of present state of the at least one parameters and the at least one sub parameters contributing to the performance of the CSFs;

generating, by the processor, a system dynamics model associated with the outsourcing engagement to assess the value for the determined at least one parameter and at least one sub parameter wherein the system dynamics model is configured to define rules of assessment of the performance based on interdependencies and nature of the at least one parameter and the at least one sub parameter, wherein the rules of assessment are based on variables characterizing the interdependencies among the plurality of parameters and the at least one CSF, wherein the variables are one of a level variable, a stock variable, a rate variable, and an auxiliary variable;

identifying, by the processor, a benchmark value for at least one of the plurality of parameters and the plurality of sub parameters based on at least one of industry standards and vendor-client expectations, wherein the benchmark value is indicative of ideal performance; and comparing, by the processor, the value assessed for the at least one parameter and the at least one sub parameter with the benchmark value identified for the at least one parameter and the sub parameter, respectively to generate a score for the at least one parameter and the at least one sub parameter.

4. The method as claimed in claim 3 further comprising determining a score for each of the identified at least one CSF based on the generated score for the at least one parameter and the at least one sub parameter.

5. The method as claimed in claim 3 further comprising determining a causal model for the outsourcing engagement based on the interdependencies among the at least one of the plurality of parameters, and the plurality of sub parameters for developing the system dynamics model.

6. The method as claimed in claim 3, wherein the assessing further comprises simulating the system dynamics model to generate simulated parameters and simulated sub parameters corresponding to the plurality of parameters and the plurality of sub parameters, respectively.

7. The method as claimed in claim 3, wherein the identified at least one CSF comprises at least one of production costs reduction, transaction costs reduction, contractual completeness, vendor resource utilization, demarcation of labor, vendor behavior control, stakeholder management, core competence management, relationship exploitation, alliance exploitation, and social exchange exploitation.

8. The method as claimed in claim 3, wherein the plurality of parameters and the plurality of sub parameters are associated with a respective weight based on respective importance and relevance, and wherein the respective weight is indicative of contribution of the plurality of parameters and the sub parameters to the performance of the outsourcing engagement.

9. The method as claimed in claim 3, wherein the assessing further comprising receiving value for at least one parameter and at least one sub parameter from amongst the plurality of parameters and the plurality of sub parameters, respectively, from at least one of the vendor and the client.

10. A non-transitory computer-readable medium having embodied thereon a computer readable program code for executing a method for identifying inter-dependencies among a plurality of parameters and sub-parameters and one or more Critical Success Factors (CSFs) in, the method comprising:

identifying at least one Critical Success Factor (CSF), from the one or more CSFs, associated with the outsourcing engagement, wherein the at least one CSF is identified based on domain of the outsourcing engagement, type of the outsourcing engagement and nature of the outsourcing engagement;

generating a causal model by determining at least one parameter from the plurality of parameters and at least one sub parameter from the plurality of sub parameters affecting performance and behavior of the identified at least one CSF, wherein the at least one parameter and at least one sub parameter of each of the CSF are inter related and dependent on parameters of other CSFs, wherein the causal model generated for the outsourcing engagement defines relation among the identified CFS and other CSFs forming subset of CSFs associated with the outsourcing engagement, and wherein a hierarchical classification of CSFs associated with the plurality of parameters and the plurality of sub parameters determines the at least one parameters and the at least one sub parameters to be associated with the identified CSFs;

simulating, by the processor, the generated causal model to determine a value associated with the at least one parameters and the at least one sub parameters, wherein the simulation is based on rules and variables of the causal model, and wherein the determined value is indicative of present state of the at least one parameters and the at least one sub parameters contributing to the performance of the CSFs; and generating a system dynamics model associated with the outsourcing engagement to assess the value for the determined at least one parameter and at least one sub parameter wherein the system dynamics model is configured to define rules of assessment of the performance based on interdependencies and nature of the at least one parameter and the at least one sub parameter, wherein the rules of assessment are based on variables characterizing the interdependencies among the plurality of parameters and the at least one CSF, wherein the variables are one of a level variable, a stock variable, a rate variable, and an auxiliary variable;

identifying a benchmark value for at least one of the plurality of parameters and the plurality of sub parameters based on at least one of industry standards and vendor-client expectations, wherein the benchmark value is indicative of ideal performance; and comparing the value assessed for the at least one parameter and the at least one sub parameter with the benchmark value identified for the at least one parameter and the sub parameter, respectively to generate a score for the at least one parameter and the at least one sub parameter.

* * * * *